(12) United States Patent
Ma

(10) Patent No.: US 10,036,923 B2
(45) Date of Patent: Jul. 31, 2018

(54) ULTRA-SLIM BEZEL DISPLAY PANEL

(71) Applicant: Shenzhen China Star Optoelectronics Technology Co., Ltd., Shenzhen (CN)

(72) Inventor: Chao Ma, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 0 days.

(21) Appl. No.: 15/856,083

(22) Filed: Dec. 28, 2017

(65) Prior Publication Data

US 2018/0120651 A1 May 3, 2018

Related U.S. Application Data

(63) Continuation of application No. 14/781,311, filed on Sep. 30, 2015, now Pat. No. 9,885,918.

(30) Foreign Application Priority Data

Aug. 7, 2015 (CN) .......................... 2015 1 0483510

(51) Int. Cl.
*G02F 1/1337* (2006.01)
*G02F 1/1339* (2006.01)
*G02F 1/1362* (2006.01)
*G02F 1/1368* (2006.01)

(52) U.S. Cl.
CPC .... *G02F 1/133723* (2013.01); *G02F 1/13394* (2013.01); *G02F 1/136209* (2013.01); *G02F 1/1368* (2013.01); *G02F 2001/13396* (2013.01); *G02F 2001/136236* (2013.01)

(58) Field of Classification Search
None
See application file for complete search history.

(56) References Cited

U.S. PATENT DOCUMENTS

| | | | | |
|---|---|---|---|---|
| 2010/0265439 A1* | 10/2010 | Ishitobi | .................. | G02B 5/201 349/106 |
| 2011/0013125 A1* | 1/2011 | Lee | .................... | G02F 1/133711 349/106 |
| 2014/0063431 A1* | 3/2014 | Shih | ..................... | G02F 1/1339 349/153 |
| 2014/0104529 A1* | 4/2014 | Ikeda | ..................... | G02F 1/136 349/43 |

(Continued)

*Primary Examiner* — Ryan Crockett
(74) *Attorney, Agent, or Firm* — Leong C. Lei

(57) ABSTRACT

An ultra-slim bezel display panel includes a plurality of light blocking walls formed on a peripheral area of a TFT substrate and a plurality of light blocking walls and a plurality grooves formed on a peripheral area of the CF substrate. The heights of the light blocking walls and the widths of the grooves are determined by taking an additional jet quantity resulting from precision error of a machine into consideration so that, through calculation, the laid sizes of the light blocking walls and the grooves can be correctly determined to prevent, during coating of Pl liquid on the TFT substrate and the CF substrate, the Pl liquid coated on an outer circumference of an active area from flowing backward into the active area. The light blocking walls that are provided on the TFT substrate and have different heights are formed through exposure with a half-tone mask.

8 Claims, 2 Drawing Sheets

(56) References Cited

U.S. PATENT DOCUMENTS

2015/0131041 A1\* 5/2015 Moriwaki ............. G02F 1/1337
                                                                349/106
2016/0238866 A1\* 8/2016 Yamaguchi ....... G02F 1/133512
2017/0146860 A1\* 5/2017 Ma .................... G02F 1/133621

\* cited by examiner

Active Area Boundary    PI Jet-Printing Boundary

ULTRA-SLIM BEZEL DISPLAY PANEL

CROSS REFERENCE TO RELATED APPLICATIONS

This is a continuation application of co-pending U.S. patent application Ser. No. 14/781,311, filed on Sep. 30, 2015, which is a national stage of PCT Application No. PCT/CN2015/087946, filed on Aug. 24, 2015, claiming foreign priority of Chinese Patent Application No. 201510483510.3, filed on Aug. 7, 2015.

BACKGROUND OF THE INVENTION

1. Field of the Invention

The present invention relates to the field of manufacture of display devices, and in particular to an ultra-slim bezel display panel.

2. The Related Arts

Liquid crystal displays (LCDs) have a variety of advantages, such as thin device body, low power consumption, and being free of radiation, and are thus used widely. Most of the LCDs that are currently available in the market are backlighting LCDs, which comprise a liquid crystal display panel and a backlight module. The operation principle of the liquid crystal display panel is that liquid crystal molecules are arranged between two parallel glass substrates and electricity is applied to the glass substrates to control the liquid crystal molecules to change direction in order to refract out light from the backlight module to generate an image.

A liquid crystal display panel is generally made up of a color filter (CF) substrate, a thin-film transistor (TFT) substrate, liquid crystal (LC) interposed between the CF substrate and the TFT substrate, and sealant. The TFT substrate and the CF substrate are often each provided with a alignment film formed thereon. When put in contact with LC, the alignment film causes LC to generate a pre-tilt angle in a predetermined direction so as to provide the liquid crystal molecules with a carrying angle (wherein the value of the pre-tilt angle shows important influence on the driving voltage of TFT-LCD, contrast, response time, and view angle). The alignment film is usually made of a material selected from polyimide (Pl) materials and is formed by coating a Pl solution on a substrate.

With the progress of the display technology, the requirement of general consumers for consumer electronic products is no longer limited to functionality and also additionally asking for considerations regarding designs and aesthetics and good visual experience. For example, ultra-slim bezel products are currently prevailing and as the name suggests, an ultra-slim bezel is made by further narrowing down a bezel of a conventional TFT-LCD to thus expand the area of an active area (AA) thereby achieving upgraded visual experience and aesthetics of product design. In view of this, to challenge an even higher level of LCD panel design and manufacture, such as device preciseness and material performance compatibility, upgrading and improvement to a significant extent is thus necessary.

Accuracy of coating a Pl solution is thus becoming important. This is because an ultra-slim bezel design is different from the prior art designs and the distance that the AA zone is spaced form an edge of a glass substrate is closer. In addition, during the coating process of the Pl solution, factors, such as back flowing of Pl after coating and accuracy control of film shrinkage after Pl has been baked, must be considered. Once the accuracy of the Pl coating at a peripheral area of a panel is not well controlled, Pl on a circumferential area of an LCD panel may flow backward to the AA zone so as to cause a mura phenomenon (a phenomenon where brightness is not uniform) on a periphery of the AA zone. This would greatly affect the quality and yield rate of the panel.

In view of the above, manufacturers of the industry often intend to overcome the above problems through change of the design. Such as a color resist wall arranged outside the AA zone to control the phenomenon of Pl backward flowing. This, to some extents, stiff suffers the same problem of non-uniform backward flowing of Pl and mura may appear on the circumference of the panel.

SUMMARY OF THE INVENTION

An object of the present invention is to provide an ultra-slim bezel display panel, which helps improve the mura phenomenon occurring in a circumference of an active area resulting from backward flowing of IP commonly encountered in an ultra-slim bezel display panel and thus increases the yield rate.

To achieve the above object, the present invention provides an ultra-slim bezel display panel, which comprises a thin-film transistor (TFT) substrate and a color filter (CF) substrate that are opposite to each other and circumferential enclosure sealant that hermetically connects between the TFT substrate and the CF substrate, the TFT substrate and the CF substrate each having an active area located in a central portion thereof and a peripheral area located on an outer circumference of the active area, the active areas and the peripheral areas of the TFT substrate and the CF substrate respectively corresponding to each other, the circumferential enclosure sealant being arranged between the peripheral areas of the TFT substrate and the CF substrate;

wherein the peripheral area of the TFT substrate comprises a plurality of light blocking walls formed thereon and the peripheral area of the CF substrate comprises a plurality of light blocking walls and a plurality of grooves formed thereon whereby when a polyimide (Pl) liquid is coated on the TFT substrate and the CF substrate, the Pl liquid coated on the peripheral areas is prevented from flowing backward into the active areas.

The peripheral area of the TFT substrate comprises four light blocking walls formed thereon, which are respectively, in sequence from the outside of the TFT substrate to the inside thereof, a first light blocking wall, a second light blocking wall, a third light blocking wall, and a fourth light blocking wall; and the first and second light blocking walls are respectively set on the outside and the inside of the circumferential enclosure sealant and each defines a predetermined gap with respect to the circumferential enclosure sealant, the second light blocking wall having an inner side that defines a Pl jet-printing boundary, the third and fourth light blocking walls being set between a boundary of the active area and the Pl jet-printing boundary;

the CF substrate comprises a block matrix formed thereon and a portion of the block matrix that is located in the peripheral area of the CF substrate comprises three light blocking walls, which are respectively, in sequence from the outside of the CF substrate to the inside thereof, a fifth light blocking wall, a sixth light blocking wall, and a seventh light blocking wall; and the fifth and sixth light blocking walls are respectively set on the outside and the inside of the circumferential enclosure sealant and each defines a predetermined gap with respect to the circumferential enclosure sealant, the sixth light blocking wall having an inner side that defines a Pl jet-printing boundary, the seventh light blocking wall being set between a boundary of the active area and the Pl jet-printing boundary; and the block matrix comprises a first groove corresponding to a location between the sixth and seventh light blocking walls and a second groove corresponding to an inner side of the seventh light blocking wall.

Widths and lengths the first, second, third, and fourth light blocking walls are identical.

A height $d_2$ of the fourth light blocking wall is greater than a height $d_1$ of the third light blocking wall and the heights $d_1$ and $d_2$ satisfy the following conditions:

$$d_1 = \frac{2Y \times l_1 + Y \times l_0}{2l_1},$$

$$d_2 = \frac{L \times Y \times l_0 + L \times Y \times l_2 + X}{L \times l_2},$$

where $l_0$ and L respectively denote the width and length of the third and fourth light blocking walls; $l_1$ is a spacing distance between the second and third light blocking walls; $l_2$ is a spacing distance between the third and fourth light blocking walls; X denotes precision error of a liquid machine; and Y denotes a thickness of a wet film formed through coating of the Pl liquid.

Heights of the first and second light blocking walls are identical and the heights of the first and second light blocking walls, $d_0$, is greater than a height of the fourth light blocking wall, $d_2$.

The first, second, third, and fourth light blocking walls are formed through exposure by applying a half-tone mask.

Color resist layers are arranged under the first, second, third, and fourth light blocking walls of the TFT substrate, the first, second, third, and fourth light blocking walls and the color resist layers being formed through the same mask based manufacturing process, the first, second, third, and fourth light blocking walls being formed of color resists.

Widths and heights of the fifth, sixth, and seventh light blocking walls are identical.

Widths and heights of the first groove and the second groove are identical and the width of the first and second grooves, l, satisfies the following condition:

$$l \geq \frac{K \times Y \times L + 2L}{2L \times (H + h - Y)},$$

where K, H, L respectively denote the width, the height, and the length of the fifth, sixth, and seventh light blocking walls; h is the height of the first and second grooves; X denotes precision error of the Pl liquid machine; and Y denotes a thickness of a wet film formed through coating of the Pl liquid.

The active area of the CF substrate is provided with a plurality of uniformly distributed photo spacers, the fifth, sixth, and seventh light blocking walls and the photo spacers being formed through the same mask based manufacturing process, the fifth, sixth, and seventh light blocking walls and the photo spacers being formed of the same material.

The present invention also provides an ultra-slim bezel display panel, which comprises a TFT substrate and a CF substrate that are opposite to each other and circumferential enclosure sealant that hermetically connects between the TFT substrate and the CF substrate, the TFT substrate and the CF substrate each having an active area located in a central portion thereof and a peripheral area located on an outer circumference of the active area, the active areas and the peripheral areas of the TFT substrate and the CF substrate respectively corresponding to each other, the circumferential enclosure sealant being arranged between the peripheral areas of the TFT substrate and the CF substrate;

wherein the peripheral area of the TFT substrate comprises a plurality of light blocking walls formed thereon and the peripheral area of the CF substrate comprises a plurality of light blocking walls and a plurality of grooves formed thereon whereby when a Pl liquid is coated on the TFT substrate and the CF substrate, the Pl liquid coated on the peripheral areas is prevented from flowing backward into the active areas;

wherein the peripheral area of the TFT substrate comprises four light blocking walls formed thereon, which are respectively, in sequence from the outside of the TFT substrate to the inside thereof, a first light blocking wall, a second light blocking wall, a third light blocking wall, and a fourth light blocking wall; and the first and second light blocking walls are respectively set on the outside and the inside of the circumferential enclosure sealant and each defines a predetermined gap with respect to the circumferential enclosure sealant, the second light blocking wall having an inner side that defines a Pl jet-printing boundary, the third and fourth light blocking walls being set between a boundary of the active area and the Pl jet-printing boundary;

the CF substrate comprises a block matrix formed thereon and a portion of the block matrix that is located in the peripheral area of the CF substrate comprises three light blocking walls, which are respectively, in sequence from the outside of the CF substrate to the inside thereof, a fifth light blocking wall, a sixth light blocking wall, and a seventh light blocking wall; and the fifth and sixth light blocking walls are respectively set on the outside and the inside of the circumferential enclosure sealant and each defines a predetermined gap with respect to the circumferential enclosure sealant, the sixth light blocking wall having an inner side that defines a Pl jet-printing boundary, the seventh light blocking wall being set between a boundary of the active area and the Pl jet-printing boundary; and the block matrix comprises a first groove corresponding to a location between the sixth and seventh light blocking walls and a second groove corresponding to an inner side of the seventh light blocking wall;

wherein widths and lengths the first, second, third, and fourth light blocking walls are identical;

wherein the first, second, third, and fourth light blocking walls are formed through exposure by applying a half-tone mask;

wherein color resist layers are arranged under the first, second, third, and fourth light blocking walls of the TFT substrate, the first, second, third, and fourth light blocking walls and the color resist layers being formed through the same mask based manufacturing process, the first, second, third, and fourth light blocking walls being formed of color resists;

wherein widths and heights of the fifth, sixth, and seventh light blocking walls are identical; and wherein the active area of the CF substrate is provided with a plurality of uniformly distributed photo spacers, the fifth, sixth, and seventh light blocking walls and the photo spacers being formed through the same mask based manufacturing process, the fifth, sixth, and seventh light blocking walls and the photo spacers being formed of the same material.

The efficacy of the present invention is that the present invention provides an ultra-slim bezel display panel, which comprises a plurality of light blocking walls formed on a peripheral area of a TFT substrate and a plurality of light blocking walls and a plurality of grooves formed on a peripheral area of the CF substrate, wherein the heights of the light blocking walls and the widths of the grooves are determined by taking an additional jet quantity resulting from precision error of a machine into consideration so that, through calculation, the laid sizes of the light blocking walls and the grooves can be correctly determined to prevent, during coating of Pl liquid on the TFT substrate and the CF substrate, the Pl liquid coated on an outer circumference of an active area from flowing backward into the active area and thus, improve the mura phenomenon occurring in the circumference of the active area and also, to use the light blocking walls on the inside and the outside of circumferential enclosure sealant to achieve an effect of maintaining a cell thickness of a panel around the circumferential enclosure sealant to further improve the quality of a display panel and increase yield rate. The light blocking walls that are provided on the TFT substrate and have different heights are formed through exposure by the application of a half-tone mask so that the manufacturing process of the liquid crystal display panel is simplified and manufacturing cost lowered down.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

The present invention provides an ultra-slim bezel display panel, which can overcome, to the maximum extent, the phenomenon of polyimide (Pl) liquid backward flowing and effectively improving mura occurring in a periphery that is commonly found in ultra-slim bezels due to backward flowing of Pl liquid so as to improve yield rate issues caused by Pl in ultra-slim bezel designs.

Specifically, referring to FIGS. 1-4, the ultra-slim bezel display panel comprises a thin-film transistor (TFT) substrate 10 and a color filter (CF) substrate 20 that are opposite to each other and circumferential enclosure sealant 30 that hermetically connects between the TFT substrate 10 and the CF substrate 20. The TFT substrate 10 and the CF substrate 20 each have an active area located in a central portion thereof and a peripheral area located on an outer circumference of the active area and the active areas and the peripheral areas of the TFT substrate 10 and the CF substrate 20 respectively correspond to each other. The circumferential enclosure sealant 30 is arranged between the peripheral areas of the TFT substrate 10 and the CF substrate 20.

Figure 1:
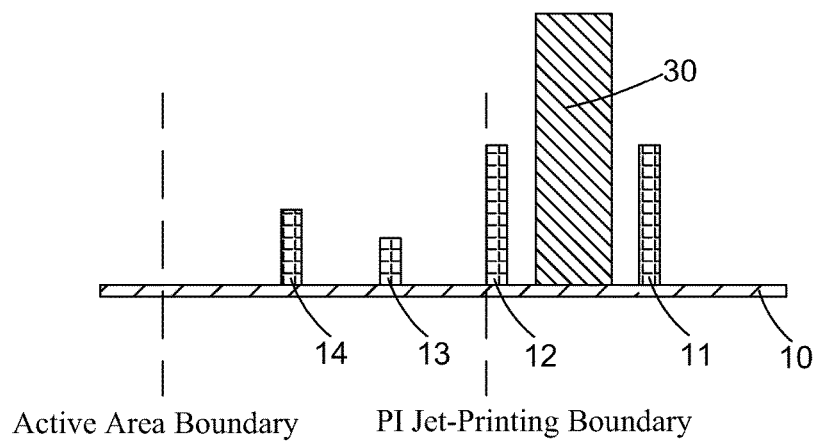
FIG. 1 is a schematic view illustrating a thin-film transistor (TFT) substrate of an ultra-slim bezel display panel according to the present invention.
Figure 2:
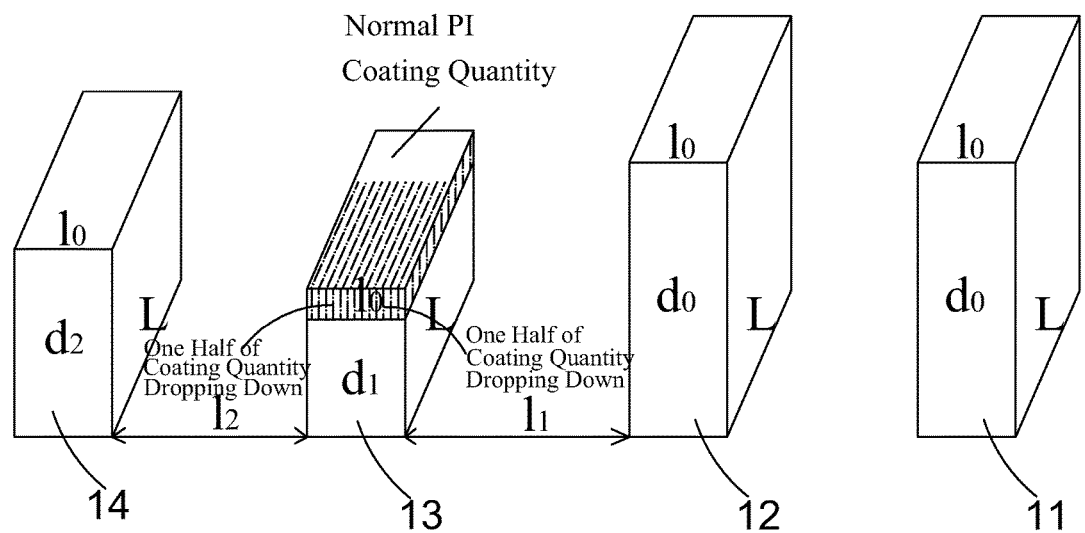
FIG. 2 is a perspective view illustrating light blocking walls formed on the TFT substrate of FIG. 1.

As shown in FIGS. 1-2, the peripheral area of the TFT substrate 10 comprises four light blocking walls formed thereon, which are respectively, in sequence from the outside of the TFT substrate 10 to the inside thereof, a first light blocking wall 11, a second light blocking wall 12, a third light blocking wall 13, and a fourth light blocking wall 14.

Specifically, color resist layers are arranged under the first, second, third, and fourth light blocking walls 11, 12, 13, 14 of the TFT substrate 10. The first, second, third, and fourth light blocking walls 11, 12, 13, 14 and the color resist layers are formed through the same mask based manufacturing process. The first, second, third, and fourth light blocking walls 11, 12, 13, 14 are formed of color resists.

The first and second light blocking walls 11, 12 are respectively set on the outside and the inside of the circumferential enclosure sealant 30 and each defines a predetermined gap with respect to the circumferential enclosure sealant 30. The second light blocking wall 12 has an inner side that defines a Pl jet-printing boundary. The third and fourth light blocking walls 13, 14 are set between a boundary of the active area and the Pl jet-printing boundary.

Specifically, the first and second light blocking walls 11, 12 provide an effect of maintaining cell thickness of the panel around the circumferential enclosure sealant 30. The first light blocking wall 11 also provides an effect of preventing outward spilling of the circumferential enclosure sealant 30. The second light blocking wall 12 provides an effect of preventing the circumferential enclosure sealant 30 and Pl from overlapping.

Specifically, the first, second, third, and fourth light blocking walls 11, 12, 13, 14 are identical in respect of width and length, where the width is designated as $l_0$ and length L.

Specifically, the fourth light blocking wall 14 has a height $d_2$ that is greater than a height $d_1$ of the third light blocking wall 13. The heights, $d_1$ and $d_2$, satisfy the following conditions:

$$d_1 = \frac{2Y \times l_1 + Y \times l_0}{2l_1},$$

$$d_2 = \frac{L \times Y \times l_0 + L \times Y \times l_2 + X}{L \times l_2},$$

where $l_0$ and L respectively denote the width and length of the third and fourth light blocking walls 13, 14; $l_1$ is a spacing distance between the second and third light blocking walls 12, 13; $l_2$ is a spacing distance between the third and fourth light blocking walls 13, 14; X denotes precision error of a Pl liquid machine; and Y denotes a thickness of a wet film formed through coating of the Pl liquid.

Specifically, the rationale for calculating the heights, $d_1$ and $d_2$, of the third and fourth light blocking walls 13, 14 is as follows:

As shown in FIG. 2, the quantity S1 of Pl liquid to be accommodated between the second and third light blocking walls 12, 13 is made up of two portions: a normal coating quantity+one half (½) of the quantity sliding down from the third light blocking wall 13, meaning $S1=l_1 \times L \times Y + (l_0 \times L \times Y/2)$; and S1 is also determined by the height $d_1$ of the shorter third light blocking wall 13, meaning: $S1=d_1 \times L \times l_1 = l_1 \times L \times Y + (l_0 \times L \times Y/2)$, from which it is known that $$d_1 = \frac{2Y \times l_1 + Y \times l_0}{2l_1}.$$

Similarly, the quantity S2 of the Pl liquid to be accommodated between the third and fourth light blocking walls 13, 14 is made up of four portions: a normal coating quantity+one half (½) of the quantity sliding down from the third light blocking wall 13+one half (½) of the quantity sliding down from the fourth light blocking wall 14+an additional jet quantity X resulting from precision error of the machine, meaning $S2=l_2 \times L \times Y + l_0 \times L \times Y/2 + l_0 \times L \times Y/2 + X$; and S2 is also determined by the height $d_2$ of the fourth light blocking wall 14, meaning $S2=d_2 \times L \times l_2 = l_2 \times L \times Y + (l_0 \times L \times Y) + X$, from which it is known that $$d_2 = \frac{L \times Y \times l_0 + L \times Y \times l_2 + X}{L \times l_2}.$$

Specifically, the heights of the first and second light blocking walls 11, 12 are identical, both being do, and the height do of the first and second light blocking walls 11, 12 is slightly greater than the height $d_2$ of the fourth light blocking wall 14.

Preferably, the first, second, third, and fourth light blocking walls 11, 12, 13, 14 are formed through exposure with a half-tone mask.

Figure 3:
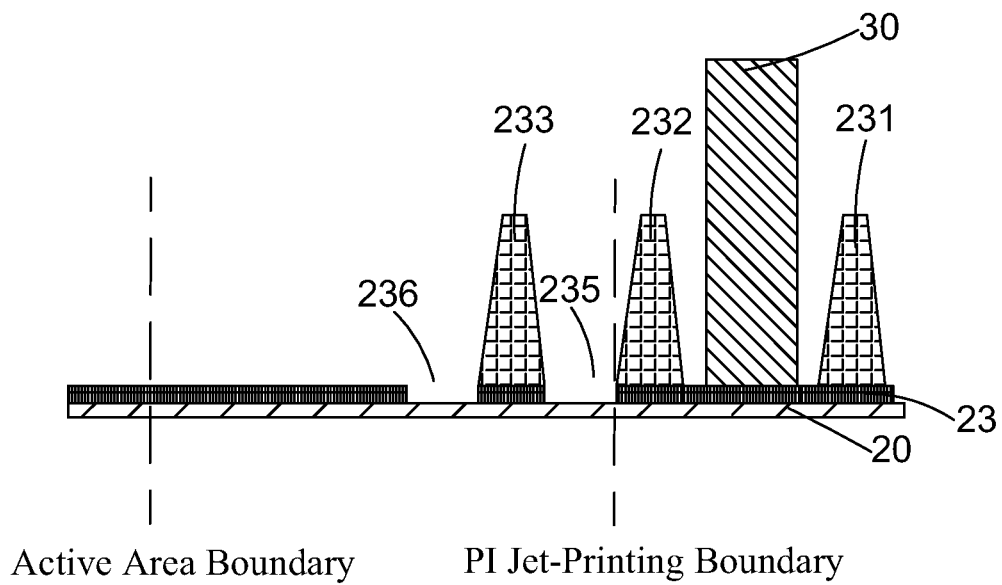
FIG. 3 is a schematic view illustrating a color filter (CF) substrate of the ultra-slim bezel display panel according to the present invention.
Figure 4:
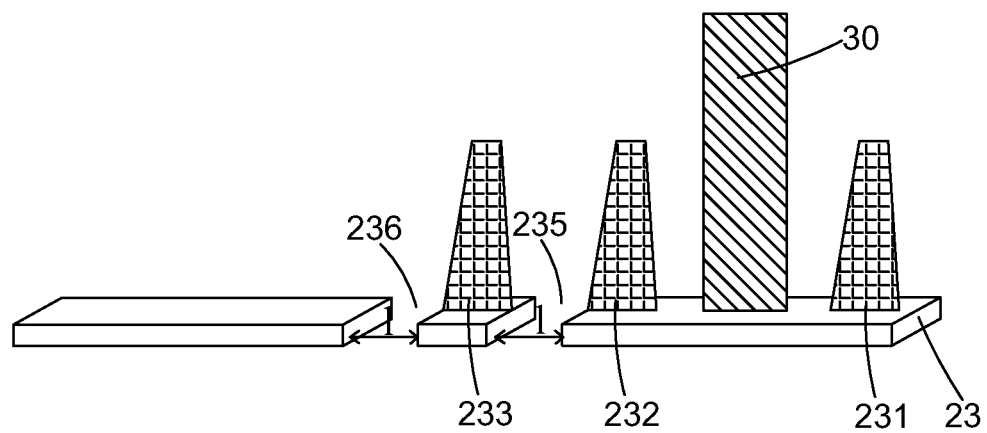
FIG. 4 is a perspective view illustrating light blocking walls and black matrix grooves formed on the CF substrate of FIG. 3.

As shown in FIGS. 3-4, the CF substrate 20 comprises a block matrix 23 formed thereon and the portion of the block matrix 23 that is located in the peripheral area of the CF substrate 20 comprises three light blocking walls, which are respectively, in sequence from the outside of the CF substrate 20 to the inside thereof, a fifth light blocking wall 231, a sixth light blocking wall 232, and a seventh light blocking wall 233.

Specifically, the active area of the CF substrate 20 is provided with a plurality of uniformly distributed photo spacers. The fifth, sixth, and seventh light blocking walls 231, 232, 233 and the photo spacers are formed through the same mask based manufacturing process. The fifth, sixth, and seventh light blocking walls 231, 232, 233 and the photo spacers are formed of the same material.

The fifth and sixth light blocking walls 231, 232 are respectively set on the outside and the inside of the circumferential enclosure sealant 30 and each defines a predetermined gap with respect to the circumferential enclosure sealant 30. The sixth light blocking wall 232 has an inner side that defines a Pl jet-printing boundary. The seventh light blocking wall 233 is set between a boundary of the active area and the Pl jet-printing boundary.

The block matrix 23 comprises, formed therein, a first groove 235 corresponding to a location between the sixth and seventh light blocking walls 232, 233 and a second groove 236 corresponding to an inner side of the seventh light blocking wall 233.

Specifically, a space between the sixth and seventh light blocking walls 232, 233 and the first groove 235 collectively provide an effect of accommodating an additional jet quantity resulting from precision error of the machine and the quantity of Pl liquid sliding down from the seventh light blocking wall 233. The second groove 236 adjacent to the seventh light blocking wall 233 provides an effect of accommodating the quantity of Pl liquid sliding down from the seventh light blocking wall 233.

Further, the fifth and sixth light blocking walls 231, 232 provide an effect of maintaining cell thickness of the panel around the circumferential enclosure sealant 30. The fifth light blocking wall 231 also provides an effect of preventing outward spilling of the circumferential enclosure sealant 30. The sixth light blocking wall 232 provides an effect of preventing the circumferential enclosure sealant 30 and Pl from overlapping.

Specifically, the fifth, sixth, and seventh light blocking walls 231, 232, 233 are identical in respect of width, height, and length.

Preferably, the first groove 235 and the second groove 236 are identical in respect of width and height.

Specifically, the widths, l, of the first and second grooves 235, 236 satisfy the following condition:

$$l \geq \frac{K \times Y \times L + 2L}{2L \times (H + h - Y)},$$

where K, H, L respectively denote the width, the height, and the length of the fifth, sixth, and seventh light blocking walls 231, 232, 233; h is the height of the first and second grooves 235, 236; X denotes precision error of the Pl liquid machine; and Y denotes a thickness of a wet film formed through coating of the Pl liquid.

Specifically, the rationale for calculating the width, l, of the first groove 235 is as follows:

The quantity S3 of Pl liquid to be accommodated in the space between the sixth and seventh light blocking walls 232, 233 and the first groove 235 is made up of two portions: a normal coating quantity+one half (½) of the quantity sliding down from the seventh light blocking wall 233+an additional jet quantity X resulting from precision error of the machine, meaning $S3 = (L \times K \times Y)/2 + X + (Y \times L \times l)$; and S3 is also determined by the width l of the first groove 235, meaning $(H+h) \times L \times l \geq (L \times K \times Y)/2 + X + (Y \times L \times l)$, from which it is known that $$l \geq \frac{K \times Y \times L + 2L}{2L \times (H + h - Y)}.$$

In summary, the present invention provides an ultra-slim bezel display panel, which comprises a plurality of light blocking walls formed on a peripheral area of a TFT substrate and a plurality of light blocking walls and a plurality grooves formed on a peripheral area of the CF substrate, wherein the heights of the light blocking walls and the widths of the grooves are determined by taking an additional jet quantity resulting from precision error of a machine into consideration so that, through calculation, the laid sizes of the light blocking walls and the grooves can be correctly determined to prevent, during coating of Pl liquid on the TFT substrate and the CF substrate, the Pl liquid coated on an outer circumference of an active area from flowing backward into the active area and thus, improve the mura phenomenon occurring in the circumference of the active area and also, to use the light blocking walls on the inside and the outside of circumferential enclosure sealant to achieve an effect of maintaining a cell thickness of a panel around the circumferential enclosure sealant to further improve the quality of a display panel and increase yield rate. The light blocking walls that are provided on the TFT substrate and have different heights are formed through exposure by the application of a half-tone mask so that the manufacturing process of the liquid crystal display panel is simplified and manufacturing cost lowered down.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An ultra-slim bezel display panel, comprising a thin-film transistor (TFT) substrate and a color filter (CF) substrate that are opposite to each other and circumferential enclosure sealant that hermetically connects between the TFT substrate and the CF substrate, the TFT substrate and the CF substrate each having an active area located in a central portion thereof and a peripheral area located on an outer circumference of the active area, the active areas and the peripheral areas of the TFT substrate and the CF substrate respectively corresponding to each other, the circumferential enclosure sealant being arranged between the peripheral areas of the TFT substrate and the CF substrate;

wherein the peripheral area of the TFT substrate comprises four light blocking walls formed thereon, which are respectively, in sequence from the outside of the TFT substrate to the inside thereof, a first light blocking wall, a second light blocking wall, a third light blocking wall, and a fourth light blocking wall, which are spaced from each other, widths and lengths the first, second, third, and fourth light blocking walls being identical, heights of the first and second light blocking walls being identical and greater than a height of the fourth light blocking wall, the height of the fourth light blocking wall being greater than a height of the third light blocking wall, wherein the heights of the third and fourth light blocking walls satisfy the following conditions:

$$d_1 = \frac{2Y \times l_1 + Y \times l_0}{2l_1},$$

$$d_2 = \frac{L \times Y \times l_0 + L \times Y \times l_2 + X}{L \times l_2},$$

where $d_1$ and $d_2$ are respectively the heights of the third and fourth light blocking walls, $l_0$ and L respectively denote the width and length of the third and fourth light blocking walls; $l_1$ is a spacing distance between the second and third light blocking walls; $l_2$ is a spacing distance between the third and fourth light blocking walls; X denotes precision error of a liquid machine; and Y denotes a thickness of a wet film formed through coating of the Pl liquid.

2. The ultra-slim bezel display panel as claimed in claim 1, wherein the first and second light blocking walls are respectively set on the outside and the inside of the circumferential enclosure sealant and each defines a predetermined gap with respect to the circumferential enclosure sealant, the second light blocking wall having an inner side that defines a Pl jet-printing boundary, the third and fourth light blocking walls being set between a boundary of the active area and the Pl jet-printing boundary.

3. The ultra-slim bezel display panel as claimed in claim 1, wherein the CF substrate comprises a block matrix formed thereon and a portion of the block matrix that is located in the peripheral area of the CF substrate comprises three light blocking walls, which are respectively, in sequence from the outside of the CF substrate to the inside thereof, a fifth light blocking wall, a sixth light blocking wall, and a seventh light blocking wall; and the fifth and sixth light blocking walls are respectively set on the outside and the inside of the circumferential enclosure sealant and each defines a predetermined gap with respect to the circumferential enclosure sealant, the sixth light blocking wall having an inner side that defines a Pl jet-printing boundary, the seventh light blocking wall being set between a boundary of the active area and the Pl jet-printing boundary; and the block matrix comprises a first groove corresponding to a location between the sixth and seventh light blocking walls and a second groove corresponding to an inner side of the seventh light blocking wall.

4. The ultra-slim bezel display panel as claimed in claim 3, wherein widths and heights of the fifth, sixth, and seventh light blocking walls are identical.

5. The ultra-slim bezel display panel as claimed in claim 4, wherein widths and heights of the first groove and the second groove are identical and the width of the first and second grooves, l, satisfies the following condition:

$$l \geq \frac{K \times Y \times L + 2L}{2L \times (H + h - Y)},$$

where K, H, L respectively denote the width, the height, and the length of the fifth, sixth, and seventh light blocking walls; h is the height of the first and second grooves; X denotes precision error of the Pl liquid machine; and Y denotes a thickness of a wet film formed through coating of the Pl liquid.

6. The ultra-slim bezel display panel as claimed in claim 3, wherein the active area of the CF substrate is provided with a plurality of uniformly distributed photo spacers, the fifth, sixth, and seventh light blocking walls and the photo spacers being formed through the same mask based manufacturing process, the fifth, sixth, and seventh light blocking walls and the photo spacers being formed of the same material.

7. The ultra-slim bezel display panel as claimed in claim 1, wherein the first, second, third, and fourth light blocking walls are formed through exposure by applying a half-tone mask.

8. The ultra-slim bezel display panel as claimed in claim 1, wherein color resist layers are arranged under the first, second, third, and fourth light blocking walls of the TFT substrate, the first, second, third, and fourth light blocking walls and the color resist layers being formed through the same mask based manufacturing process, the first, second, third, and fourth light blocking walls being formed of color resists.

* * * * *